Figures 5, 6:
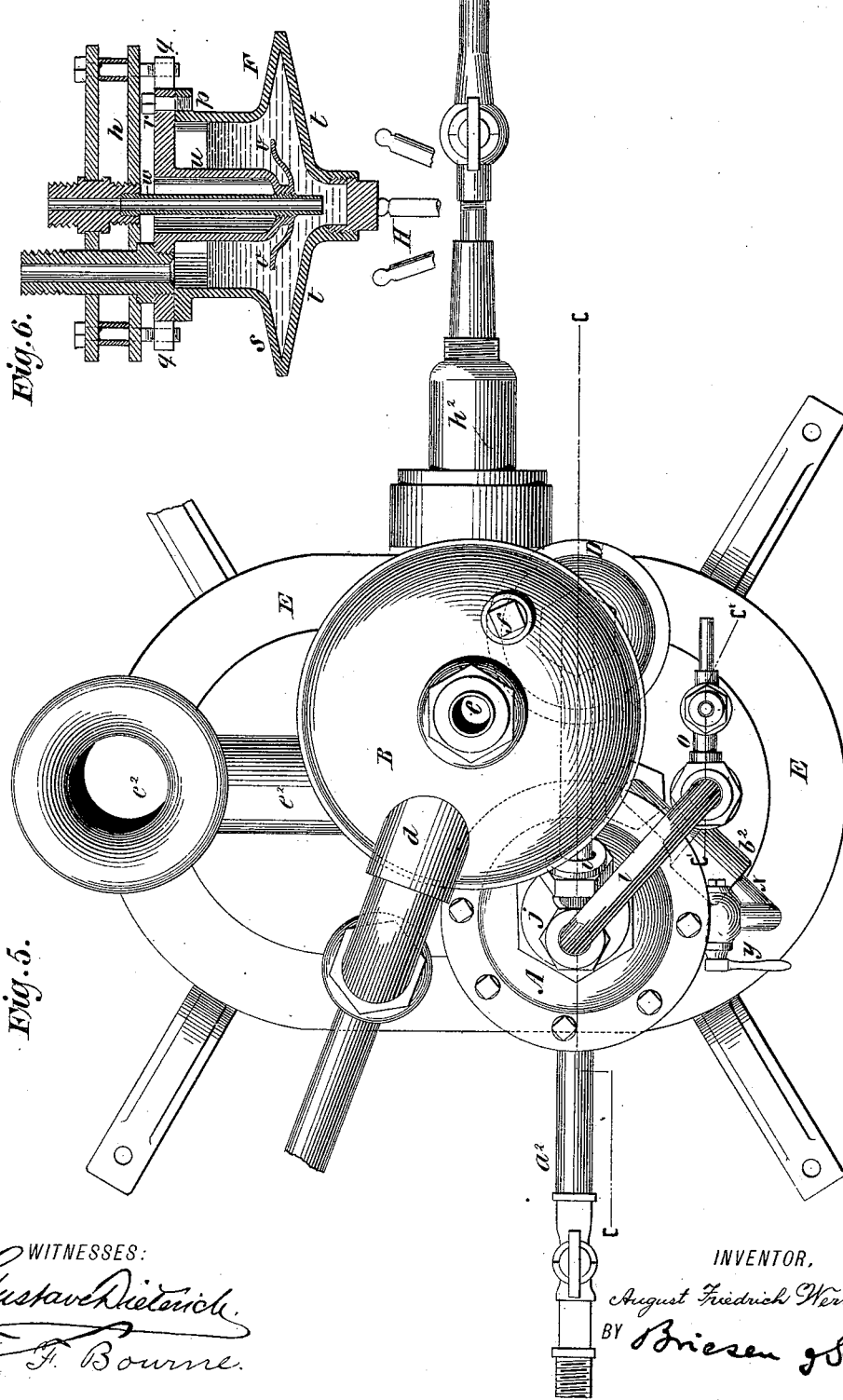

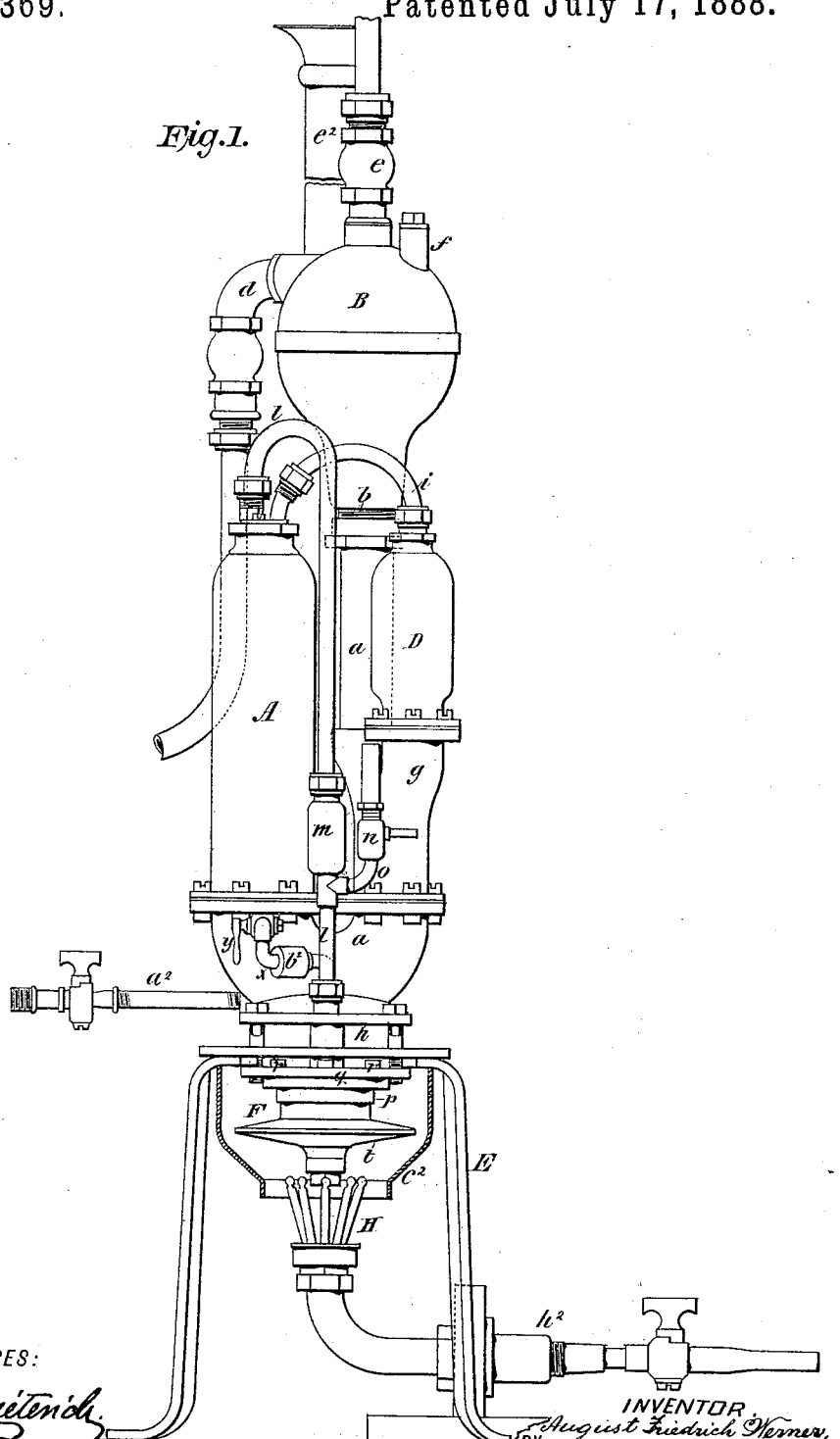

(No Model.) 3 Sheets—Sheet 2.
A. F. WERNER.
STEAM PUMP.
No. 386,369. Patented July 17, 1888.
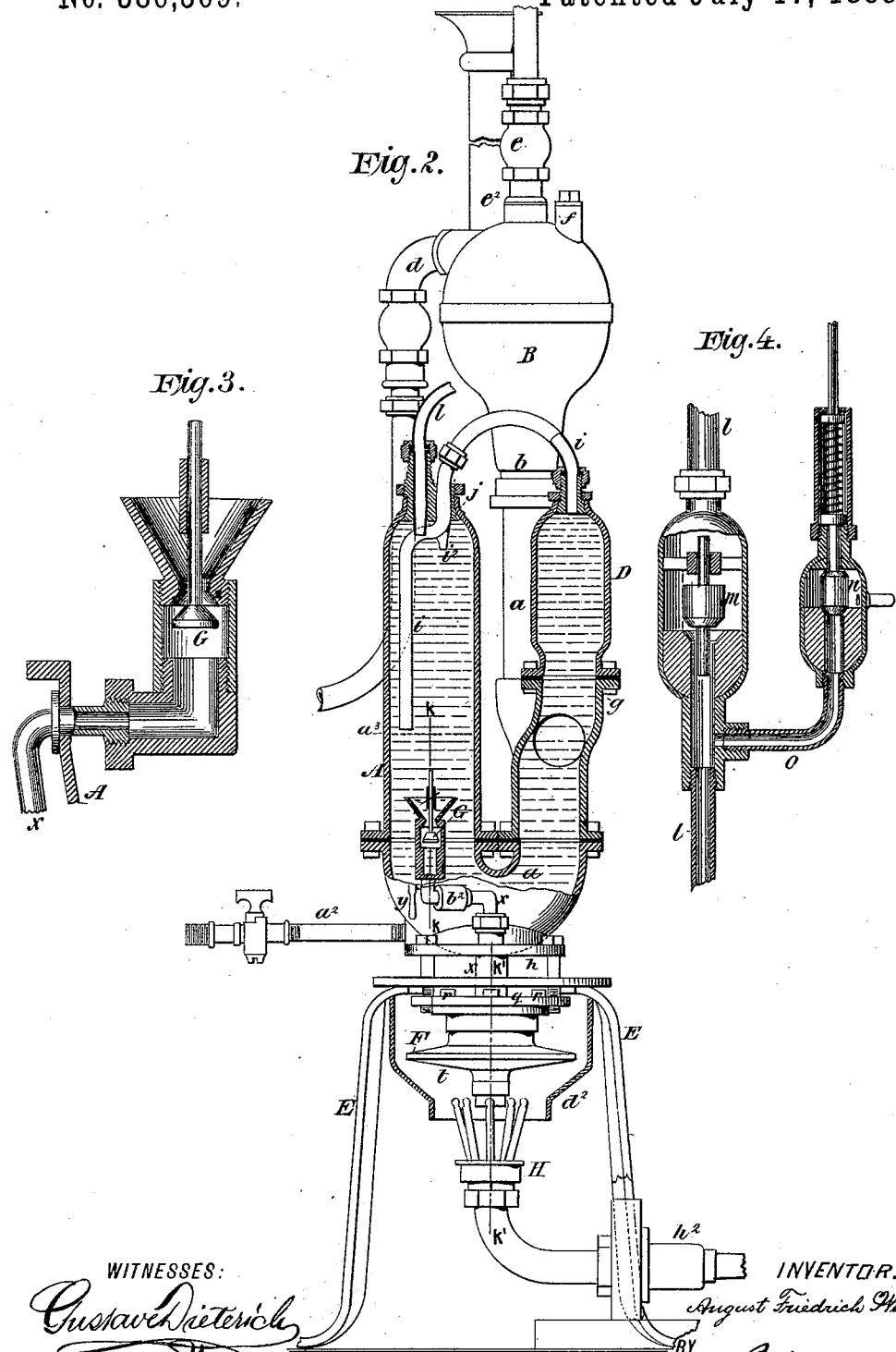
WITNESSES:
Gustav Dieterich
T. F. Bourne,
INVENTOR.
August Friedrich Werner,
BY Briesen & Steele
ATTORNEYS (No Model.) 3 Sheets—Sheet 3.

A. F. WERNER.
STEAM PUMP.

No. 386,369. Patented July 17, 1888.

WITNESSES:
Gustave Dieterich
F. F. Bourne

INVENTOR,
August Friedrich Werner,
BY Briesen & Steele
ATTORNEYS

UNITED STATES PATENT OFFICE.

AUGUST FRIEDRICH WERNER, OF NEW YORK, N. Y.

STEAM-PUMP.

SPECIFICATION forming part of Letters Patent No. 386,369, dated July 17, 1888.

Application filed October 28, 1887. Serial No. 253,595. (No model.)

*To all whom it may concern:*

Be it known that I, AUGUST FRIEDRICH WERNER, of the city, county, and State of New York, have invented an Improved Steam-Pump, of which the following is a specification.

My invention relates to that class of pumps known as "steam vacuum-pumps," wherein water is forced out of the pump by the direct pressure of steam upon the water in the pump, and by a subsequent condensation of said steam the water is replenished.

The invention consists in the novel arrangement and combination of parts for effecting the utilization of steam and sundry other operations, as will be more fully hereinafter set forth.

Reference is to be had to the accompanying drawings, forming part of this specification, in which—

Figure 1 is an elevation of my improved steam-pump. Fig. 2 is a vertical cross-section on the line $c\,c$, Fig. 5, part of the pump being shown in elevation. Fig. 3 is an enlarged vertical section on the line $k\,k$, Fig. 2. Fig. 4 is an enlarged vertical section on the line $c'\,c'$, Fig. 5. Fig. 5 is an enlarged plan view of my improved steam vacuum-pump; and Fig. 6 is an enlarged vertical section on the line $k'\,k'$, Fig. 2, showing the construction of my improved boiler.

In the accompanying drawings, A represents the working or pressure chamber, B an elevated water-chamber, and D a steam-condensing chamber, of the pump. A pipe, $a$, connects the lower part of the chamber A with the lower part of the chamber B, said chamber B being elevated above the chamber A. The chamber B is connected with the pipe $a$ by means of a screw or other coupling, $b$, whereby it may be secured upon or detached from said pipe $a$ when desired. The chamber B is in connection near its upper part with a water-supply pipe, $d$, and with a water-discharge pipe, $e$, said pipe being provided with suitable valves to check a reflow of water. The chamber B also has an opening, $f$, closed by a suitable plug, through which the pump may be filled with water before starting the operation of the pump.

To the lower part of the pipe $a$ is connected a suitable blow-off pipe, $a^2$. The lower part of the condensing-chamber D is connected with the chamber A or with the pipe $a$ by means of a pipe or neck, $g$, as shown. A small pipe, $i$, connects the upper part of the condensing-chamber D with the upper part of the pressure-chamber A, and extends a considerable distance down into said chamber A, as shown in Fig. 2; but near the top of the chamber A the pipe $i$ has a short tube or downwardly-projecting nipple, $i^2$. The pipe $a$, connecting the chambers A, B, and D, is suitably supported upon a base or frame, E, of suitable construction. An air-space, $h$, is left between the top of the base E and the lower side of the pipe $a$.

F is my improved boiler, which is supported by the base E. A steam-pipe, $l$, connects with the upper part of the boiler F and leads into the upper end of the pressure-chamber A. The pipe $l$ is provided with a valve, $m$, (see Fig. 4,) arranged to permit the upward passage of steam through said pipe; but, to prevent a downward passage of water from the chamber A through said pipe $l$, a suitable safety-valve, $n$, is connected by a branch pipe, $o$, with the pipe $l$ between the valve $m$ and the boiler F.

My improved boiler F is constructed as follows, (see Fig. 6:) $p$ is a cylinder closed at the top by a plate, $q$, secured by bolts $r$. At its lower end the cylinder $p$ is flanged outwardly, as at $s$. To the edges of this flanged part is secured an approximately dish-shaped plate or disk, $t$. The conjunction of the flange $s$ with the plate $t$ forms an acute angle, the space thus formed between the parts $s$ and $t$ being very shallow. Projecting into the boiler F, downward from the plate $q$, is a tube or well, $u$, carrying at its closed lower end a flange or disk, $v$. A tube, $w$, smaller in diameter than the tube or well $u$, passes through the tube $u$ and opens into the boiler below the disk $v$. The tube $u$ has no connection with the interior of the boiler. The steam-pipe $l$ opens into the upper part of the boiler F, preferably through the plate $q$. The feed-pipe $x$ for the boiler is connected at one end to the tube $w$, and at its other end passes into the lower part of the working or pressure chamber A. This pipe $x$ is provided with a cock, $y$.

In the pipe $x$ is a valve, G, (see Fig. 3,) adapted to be held to its seat $z$ by the pressure of the steam from the boiler F, and to be opened by the downward pressure of water within the pressure-chamber A to replenish the boiler, as hereinafter more fully stated. The pipe $x$ may also be provided with still another such valve, the outer casing of which is shown at $b^2$.

The boiler F may be heated by any suitable means. In the drawings I have shown an arrangement of gas-burners, H, in connection with a suitable gas-pipe, $h^2$. These burners or other heater are so arranged that the heat from the flame shall strike the boiler outside of the disk $v$.

In the drawings the boiler F is shown surrounded by a jacket, $d^2$, which communicates with a pipe, $e^2$, for carrying off the products of combustion.

Having described the manner of constructing a pump embodying my invention, I will now describe its operation.

Before starting the pump I fill the several chambers and pipes with water through the opening $f$ in the water-chamber B, and turn the cock $y$ until the boiler F contains about as much water as is shown in Fig. 6. I now light the gas at the burners H, when the water spread out in a thin sheet in the boiler between the disks $t$ and $v$ and flange $s$ will be quickly heated, generating steam. This steam passes upward through the pipe $l$ and presses with full force upon the water in the working or pressure chamber A, at the same time closing the valve G to prevent water entering the boiler F through the pipe $x$. The steam, pressing on the water in the chamber A, will force this water downward and out through the pipe $a$ into the chamber B, thereby forcing the water from said chamber out through the water-discharge pipe $e$. By the time the water in the chamber A has been lowered to about the level marked $a^3$ in Fig. 2, a slight distance beneath the end of the pipe $i$ within said chamber A, the pressure of the steam from the boiler F has ceased, the boiler being of such capacity as to furnish just steam enough for depressing the water thus far. The steam within the chamber A above the water-level $a^3$ will pass through the pipe $i$ into the chamber D, where it will be condensed by contact with the water therein. As the steam leaves the chamber A a vacuum is formed within said chamber, which the water left therein will immediately rush in to fill, drawing the water in the pipe $a$ and chamber B after it, causing a vacuum in the chamber B, which will immediately be filled by water from the supply-pipe $d$. As there is now but slight pressure of steam beneath the valve G, the column of water in the chamber A will open said valve, thereby admitting water to the boiler F. Steam is now freshly generated from the water in the boiler, and will again close said valve to prevent a further inflow of water to the boiler at this time. The pump will now be in the condition at which it started. The steam generated will again lower the water in chamber A, and so forth, as before.

Whenever the short tube or nipple $i^2$ is unsealed by the descent of water in the chamber A, a sufficient quantity of steam will enter the pipe $i$ through said tube or nipple to prevent water being forced from the chamber D through said pipe, the steam thereby acting as a valve to keep the water in the chamber D. If any steam be left in the chamber A when the water rushes in to fill the vacuum, it will be forced out through the short tube or nipple $i^2$, to be condensed in the chamber D. When the pump is filled with water, the valve $m$ prevents its passing through the pipe $l$ into the boiler F; but the steam-pressure from the boiler will readily raise said valve whenever it is strong enough to enter the chamber A.

By constructing my boiler as described and throwing the heat upon the boiler outside of the disk $v$ and at a distance from the entrance of the water, the cool water may gradually spread around in the boiler to prevent the generation of steam too quickly while the water is entering the boiler from the chamber A. If steam were formed immediately upon the entrance of a small quantity of water the valve G would be closed by the pressure of steam before the boiler were sufficiently fed; but with this boiler only when sufficient water has entered the boiler will steam be formed with a pressure sufficient to close the valve G to prevent a further entrance of water to the boiler. The steam, which now continues to form, is soon exhausted, being used up in forcing the water from the chamber A. As the chamber A is refilled with water the weight of water in the chamber A will overbalance the slight pressure of any remaining steam on the valve G, replenishing the boiler, as before described. By this arrangement I obtain an automatic feed to the boiler and prevent its destruction. The valve G also acts to prevent the suction in chamber A withdrawing any remaining water from the boiler F. The valve $b^2$ is placed in the pipe $x$ as a safeguard against the non-operation of the valve G.

The air-space $h$ is used to prevent heat being communicated from the boiler to the pipe $a$. The valves G and $m$ may be of any approved form to accomplish the objects desired.

Having now described my invention, what I claim is—

1. The pressure-chamber A of a steam vacuum-pump, combined with a condensing-chamber, D, by means of a pipe, $i$, passing from the upper part of the condensing-chamber into the interior of the working-chamber, said pipe $i$ having the nipple $i^2$ near the top of the working-chamber A, substantially as herein shown and described.

2. In a steam vacuum-pump, the pressure-chamber A and condensing-chamber D, and the pipe $i$, connecting said chambers at their upper ends, said pipe having an opening in the pressure-chamber near the upper end and another at a distance therefrom, said chambers being also connected at their lower ends, combined with the boiler feed-pipe $x$, containing a valve, G, said pipe $x$ entering the chamber A, the parts being so arranged that the pressure of steam from the boiler will press said valve to its seat to prevent an inflow of water to the boiler, and by which the pressure of water in the working-chamber will open said valve, when the steam-pressure upon said valve is reduced to admit water through the feed-pipe to the boiler, as set forth.

3. The combination, in a steam vacuum-pump, with a pressure-chamber, of a condensing-chamber, connected at their lower ends, and a pipe connecting said chambers at their upper ends, and having two openings within said pressure-chamber—one near the upper end of said chamber and the other at a distance therefrom—whereby all the steam may be exhausted from said pressure-chamber, substantially as described.

4. In a steam vacuum-pump, the combination of a pressure-chamber, A, a boiler, F, a steam-pipe, $l$, connecting the boiler to the chamber A, a valve, $m$, in the pipe $l$, and the pipe $x$, leading from the chamber A to the boiler and provided with the valve G, substantially as described.

5. The combination of the working-chamber A, water-chamber B, separate condensing-chamber D, pipe $i$, leading from the condensing-chamber D into the working-chamber A, and having two openings in said chamber, generator F, pipe $l$, leading from the generator to the chamber A, and valve $m$ in the pipe $l$, substantially as described.

6. The combination of the chambers A, B, and D, generator F, pipe $x$, connecting the generator with the chamber A, and valve G in the pipe $x$, all arranged for operation substantially as described.

7. The boiler F, its water-supply pipe $x$, and steam-discharge pipe $l$, combined with the pump-chambers A $a$ B D and with the intervening air-space $h$, as specified.

8. In a steam-pump, the pressure-chamber A, combined with the steam-supply pipe $l$ at its top, the steam-discharge pipe $i$ near its lower end, the steam-discharge nipple $i^2$ near its upper end, and the water-discharge pipe $x$ in its lower end, so as to utilize the pressure of steam and the weight of water in said chamber A, as set forth.

AUGUST FRIEDRICH WERNER.

Witnesses:
   HARRY M. TURK,
   CHARLES G. M. THOMAS.